Jan. 3, 1933.    J. P. GERAGHTY    1,893,406
HOOD LOCKING DEVICE FOR AUTOMOBILES
Original Filed June 30, 1931    2 Sheets-Sheet 1
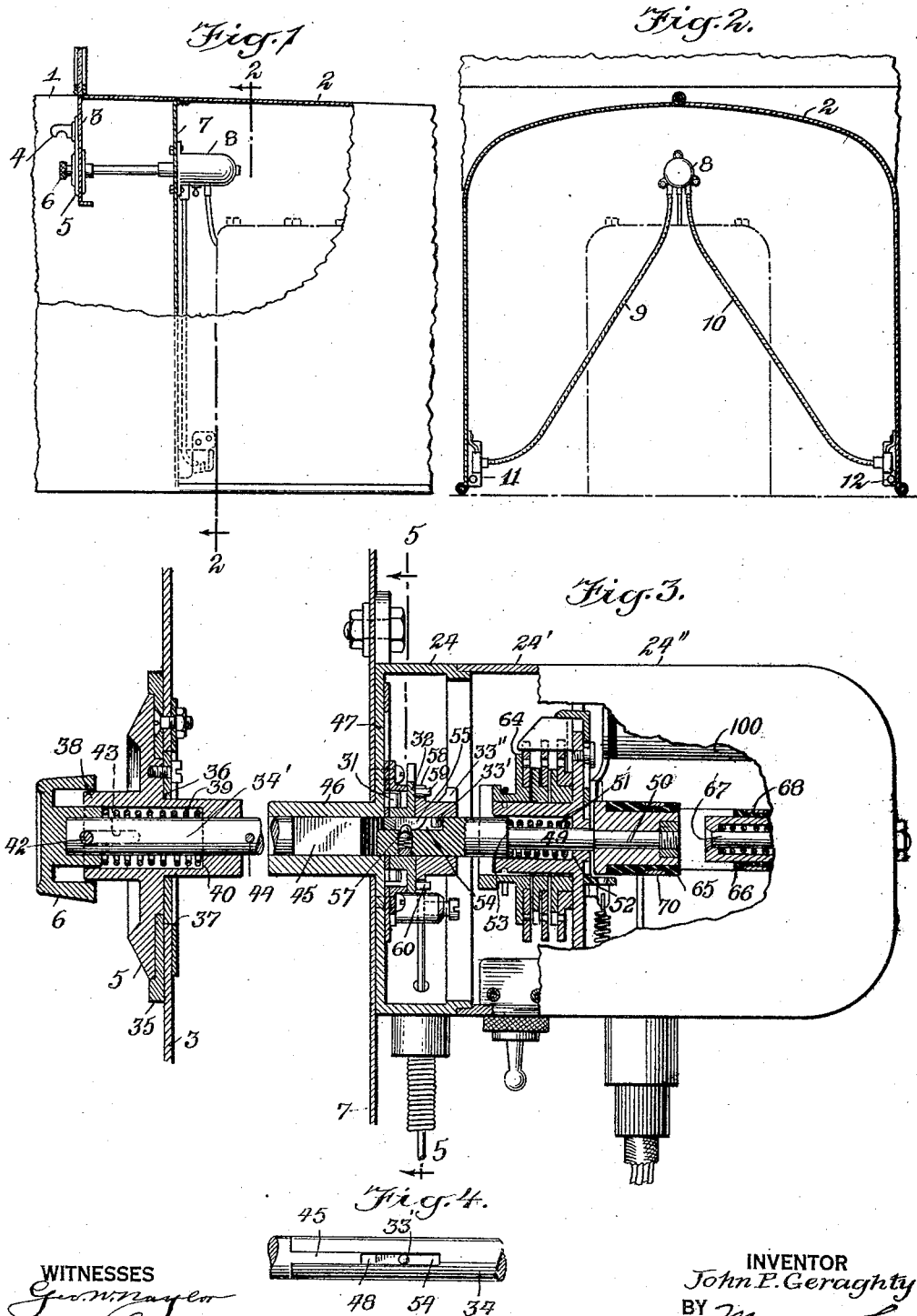
WITNESSES
INVENTOR
John P. Geraghty
BY
ATTORNEYS Jan. 3, 1933.　　　J. P. GERAGHTY　　　1,893,406
HOOD LOCKING DEVICE FOR AUTOMOBILES
Original Filed June 30, 1931　　2 Sheets-Sheet 2
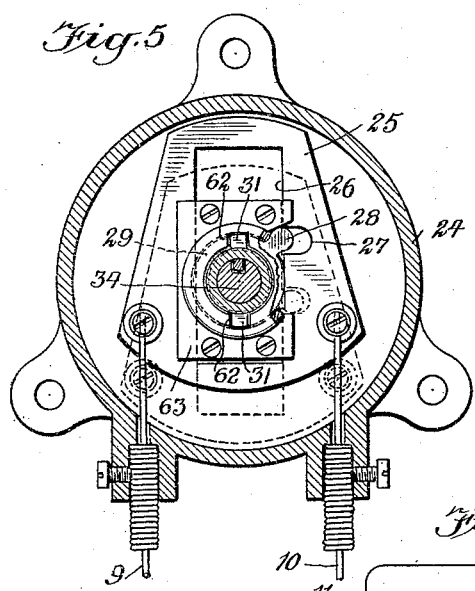
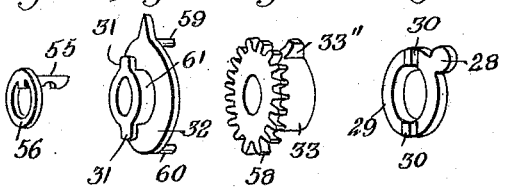
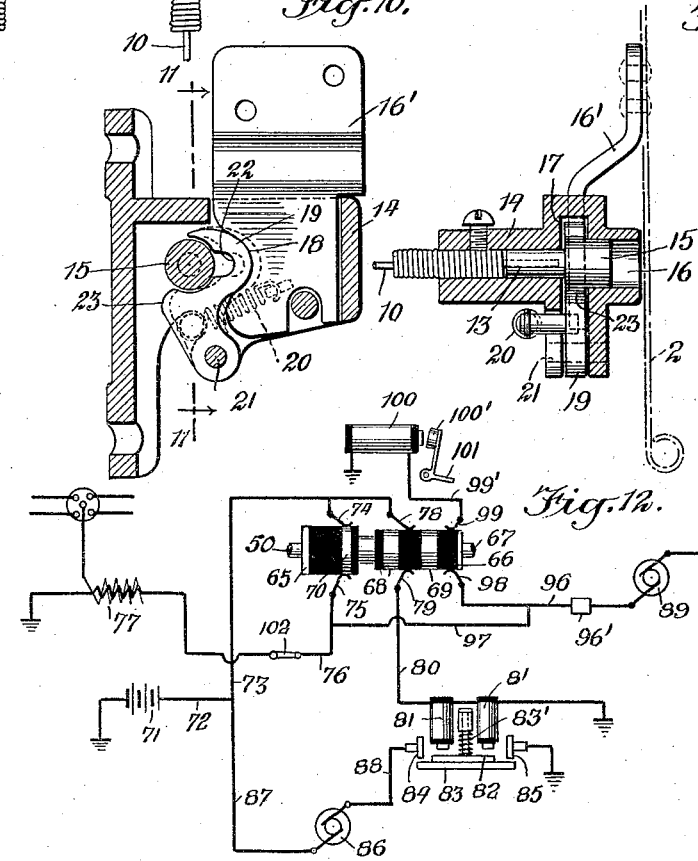
INVENTOR
John P. Geraghty
BY Munn & Co.
ATTORNEYS Patented Jan. 3, 1933

1,893,406

UNITED STATES PATENT OFFICE

JOHN P. GERAGHTY, OF JERSEY CITY, NEW JERSEY

HOOD LOCKING DEVICE FOR AUTOMOBILES

Original application filed June 30, 1931, Serial No. 548,000. Divided and this application filed February 9, 1932. Serial No. 591,903.

This invention relates to safety mechanism for automobiles, and particularly, to an improved hood locking device which functions not only to lock the hood but to control the circuits of the engine so as to prevent starting of the engine until the hood locking mechanism has functioned.

Another object of the invention is to provide a complete structure to function as a unit wherein by the operation of a single member, the hood of an automobile may be locked or unlocked and the ignition or starter circuits opened and closed.

A further object, more specifically, is to provide an improved hood lock which is manually actuated from the dash board of an automobile for locking and unlocking the hood, and the manually actuated means being associated with the switch means, which are thrown into functioning position and the hood lock is moved to a locked position and thrown into a non-functioning position when the hood lock has been moved to an unlocked position.

This application is a divisional application of my prior application, Serial Number 548,000, filed June 30th, 1931.

In the accompanying drawings—

Figure 1 is a fragmentary side view of part of an automobile showing part of the hood and associated parts, a portion of the structure being broken away for better illustrating the invention.

Figure 2 is a sectional view through Figure 1 on line 2—2.

Figure 3 is an enlarged longitudinal vertical sectional view through the lock dial and certain other operating mechanism shown in Figure 1, part of the casing being shown in elevation.

Figure 4 is a fragmentary top plan view of the control bolts or rods shown in Figure 3 and the same illustrating the sliding connection between these two members.

Figure 5 is a fragmentary sectional view through Figure 3 approximately on line 5—5.

Figure 6 is a detailed perspective view of the locking catch embodying certain features of the invention.

Figure 7 is a perspective view of a lock setting mechanism embodying certain features of the invention.

Figure 8 is a perspective view of a clutch mechanism embodying certain features of the invention.

Figure 9 is a perspective view of a ring embodying certain features of the invention.

Figure 10 is an enlarged fragmentary view partly in section and partly in elevation showing the hood locking mechanism.

Figure 11 is a sectional view through Figure 10 on line 11—11.

Figure 12 is a diagram showing the circuit of the various switch mechanisms as they appear when the parts are in running position.

Referring to the accompanying drawings by numerals, 1 indicates an automobile of any desired kind, the same being provided with a hood 2 of any preferred kind and with an instrument board 3 also of any preferred kind. Preferably, the instrument board has a lamp 4 arranged thereon immediately above the dial 5 and the hand operated knob 6. A short distance in front of the instrument board 3 is a front wall 7 which may be of any preferred structure. Carried by this front wall is a mechanism 8 which is associated with the dial 5 and thumb member 6 for accomplishing certain results including the control of the engine and locking of the hood 2. In locking the hood 2, Bowden wires 9 and 10 are used, said wires at one end extending into the mechanism 8 so as to be reciprocated by certain parts of said mechanism as hereinafter fully described. These wires extend downwardly to convenient points where they are connected to the respective locking mechanisms 11 and 12 which are adapted to lock the hood 2 closed. This locking mechanism is illustrated more particularly in Figures 10 and 11. As indicated in Figure 11, the Bowden wire 10 is provided with an enlargement 13 adapted to reciprocate in a fitting 14. The enlargement 13 has an elongated cylindrical head 15 adapted to reciprocate in the guide 16 forming part of the fitting 14. The fitting 14 is provided with what may be termed a notch 17 which is adapted to receive the bracket 16′ riveted or otherwise rigidly secured to the hood 2. This bracket at the lower end is provided with an arc-shaped recess 18 in which the locking hook 19 rests. A contractile spring 20 acts to swing the hook 19 on its pivotal support 21 until it assumes the position shown in Figure 10. When the bracket 16' has been moved out of notch 17 the hook 19 will swing over to the dotted position shown in Figure 10. When the Bowden wire 10 has been pushed by the mechanism to be hereinafter fully described and shown particularly in Figure 5, the reduced portion 13 will come opposite the hook 19 and permit the hook to swing outwardly so that the portion 22 will receive reduced portion 13 thus causing the hook to be moved completely out of the notch 18.

It will be understood that the hook does not move out of the notch 18 because of the spring 20 but as the bracket 16' is pulled upwardly it will be forced out of notch 18 so that the portion 22 will surround the reduced section 13. When the reduced section 13 is opposite the portion 22, hook 19 is free to swing and consequently the hood may be opened and closed readily. After the bracket 16' has been moved out of the notch 17, the hook 19 swings to the dotted position shown in Figure 10 and the cam or enlargement 23 moves to the dotted position shown in Figure 10 whereupon the cylindrical section 15 cannot be moved back to the position shown in Figure 11. This will prevent a longitudinal movement of the Bowden wire 10 and consequently will prevent the shutting off of the engine. However, as soon as the hood has been closed and the bracket 16' moved to the position shown in Figure 10, the hook 19 will be swung over to the full line position shown in Figure 10 so that the Bowden wire 10 may be moved to shift the cylindrical section 15 to the position shown in Figure 11 whereupon the hook 19 is locked against movement and consequently bracket 16' is locked within the fitting 14, which fitting is rigidly secured in any desired manner to the chassis of the automobile.

The Bowden wires 9 and 10 are identical and function in the same way. The locks 11 and 12 will function as just described. Bowden wires 9 and 10 extend to a position within the casing 24 where they are connected to a reciprocating plate 25. This plate has a rectangular slot 26 formed with a notch 27. Notch 27 is adapted to receive the projection 28 of the disk or ring 29, which disk is provided with one or more depressions 30 for receiving the respective pins 31 formed integral with the lock setting device 32 (Figures 3 and 7). This device is connected through clutch 33 and certain other parts herein fully described to the shaft 34 whereby whenever shaft 34 is rocked, ring 29 will be moved correspondingly and will cause the projection 28 to raise or lower the plate 25 according to the direction of movement. This will raise or lower the wires 9 and 10 to lock or unlock the respective hood locking mechanisms 11 and 12. The shaft 34 cannot be moved inwardly until after the plate 25 and associated parts have been moved to lock the locking mechanisms 11 and 12.

As shown particularly in Figure 3, the dial 5 is rotatably mounted in a plate 35 which is bolted or otherwise rigidly secured to the instrument board 3. A supporting disk 36 is screwed or otherwise rigidly secured to the dial 5 at the back thereof, said disk resting in a suitable aperture 37 in the instrument board 3. This provides an efficient support and mounting for the disk 36 whereby the disk cannot be removed without opening the hood 2. A tubular structure 38 is preferably formed integral with the dial 5 and carries a spring 39 pressing at one end against the shoulder 40 and at the opposite end against the thumb member or knob 6. A pin 42 extends through knob 6 and through a slot 43 formed in shaft 34'. This shaft carries a pin 44 for limiting the outward movement of the shaft under the action of spring 39. Shaft 34' is formed with a tongue 45 at its inner end which is the right hand end as seen in Figure 3, said tongue end fitting into a tubular extension 46 preferably formed integral with the front plate 47 of casing 24. This casing is provided with a ring 24' and a cap 24'' whereby the parts are properly protected and supported. The plate 47 is bolted or otherwise rigidly secured to the wall 7 but interiorly thereof as shown in Figures 1 and 3. The tongue 45 of shaft 34' fits into the slot or notch 48 of the shaft 34, which shaft is formed with reduced extensions 49 and 50, extension 49 being surrounded by a spring 51 acting against the plate or wall 52 preferably formed integral with the ring 24', said spring also acting against the shoulder 53 for urging shaft 34 and the parts connected therewith to the left as shown in Figure 3. Shaft 34 is provided with a longitudinally positioned slot 54 accommodating the tongue 55 which is integral with the ring 56, said tongue being held in place by a spring pressed pin 57. The tongue 55 acts against the pin 33' extending from the clutch 33 for holding the clutch so that it will move with the shaft 34. Clutch 33 as shown in Figure 8 is provided with a clutch tooth 33'' and with a gear wheel 58. Gear wheel 58 is adapted to receive the pins or projections 59 and 60 projecting from the lock setter 32. Lock setter 32 is provided with a tubular extension 61 which carries pins 31 which pins are adapted to move through their respective notches at 62 in the raised part of plate 63 (Figure 5). This plate is screwed or otherwise rigidly secured to the end plate 47 of casing 24 whereby this plate is rigid. By reason of this structure, the pins 31 must be in line with notches 62 in order to move into the position shown in Figure 3 which position is essential to an actuation of the ring 29 and projection 28 for opening or closing the hood locking mechanisms 11 and 12. As it is necessary to rotate the parts to slide plate 25 downwardly, it will be seen that when this plate is in the lower position and the locks 11 and 12 unlocked, shaft 34 cannot be moved inwardly or outwardly, and the combination lock 64 cannot be actuated, and the switch mechanism 65 cannot be actuated. The combination lock 64 is fully described in my prior pending application, Serial Number 548,000, and therefore, will not need further description at this point. The reduced extension 50 of shaft 34 is rigidly secured to the switch 65, while the switch 66 is slidingly mounted on a stationary shaft 67. This arrangement of switch is also fully disclosed in my prior pending application, Serial Number 548,000, but in order to bring in the coaction thereof with the shaft 34 and associated parts, this arrangement will be briefly described.

In order that the inner action of the shaft 34 with the switches 65 and 66 may be more fully understood, reference is made particularly to Figures 3 and 12. When the shaft 34 and associated parts have been pushed inwardly, the switches 65 and 66 will move until the contact springs 74 and 75 have moved off of ring 70, and the respective contact springs 78, 79, 99 and 98 have moved on to their respective rings 68 and 69. When in this position current will be supplied to the starter 86 but there will be no starting of the engine as the ignition circuit is not yet closed. However, when the knob 6 is released, it is forced out quickly by spring 39, and the switch 65 will move back to the position shown in Figure 12 whereupon current is supplied to the ignition circuit. When the parts are in the position just set forth, it may be stated that they are in a starting position, as current from the battery 71 will pass through wire 72, wire 73, contact finger 74, ring 70, contact finger or spring 75, wire 76, switch 102, and the primary of the spark coil 77. This will provide current to produce the spark as soon as the engine has been turned over. In addition to the current flowing in this circuit, current will pass from wire 73 through the contact finger or spring 78, ring 68, contact spring or finger 79, wire 80, electro-magnets 81, and from thence to the ground. As these magnets are energized, they will attract the armature 82, so that the switch plate 83 will be moved against the action of the spring 83' until the switch plate engages the contacts 84 and 85. Contact 85 is connected with the ground while contact 84 is connected through wire 88 to one side of the starter 86. A wire 87 is connected to the opposite side of the starter and this wire is connected to wire 72. It will thus be seen that when the parts are in position with all of the contact fingers or springs engaging their respective contact rings, current will pass from battery 71 through the ignition system and also to the starter. This will cause the engine to turn over and to explode in the usual way.

As soon as the engine begins to function, it will cause the generator 89 to function. Up to this time, the engine has been running on current from the battery 71. As soon as the generator begins to function, it will supply current through wire 96 and a device 96' which permits the current to flow in one direction but not in the opposite direction, said device being old and well known on the market. From the wire 96 current flows through the contact finger or spring 98 and from thence through ring 69, contact finger or spring 99, wire 99', electromagnet 100, and from thence to the ground, thus completing a circuit for the magnet 100 whereupon the armature 100' will be swung to the left as shown in Figure 12. This will cause the extension or catch 101 to move away from the projecting plate carried by the switch 66 and thereby permit the switch 66 to move to the left, as shown in Figure 12, until the rings 68 and 69 are out of contact with their respective contact springs or fingers. When the parts are moved to the position just described, it will be seen that the battery 71 is cut out and the starter is cut out, thus the current for the ignition system will be fed from the generator 89 and any excess current will pass in a reverse direction through wire 97, contact finger 75, ring 70, contact finger 74, wire 73, and wire 72 to the battery. As the ring 68 is out of engagement with its coacting contact fingers when in the position just described, the electro-magnets 81 will be deprived of current, and, consequently, spring 83' will move the contact bar 83 to open the circuit of the starter. All the actions just described take place very quickly and the engine starts immediately upon the switch 65 moving to the position shown in Figure 12. Almost immediately thereafter, the switch 66 will follow suit and move to the position shown in Figure 12, thus cutting out the starter. It will thus be seen that the action of the rod 34 and associated parts controls the various circuits of the engine, and the actuation of this rod also controls the hood locks 11 and 12 so that all these parts must coact. When the rod 34 has been turned so as to unlock the respective locks 11 and 12, it can be pushed inwardly and then moved outwardly causing the switches 65 and 66 and associated parts to function as set forth. In view of this it will be seen that these members coact with and depend for their successful operation on the position of the rod 34 and associated parts, and the position must be such that the locks 11 and 12 are in their locked positions when the rod 34 and associated parts are in a position to cause the switch mechanism to be actuated for starting the engine.

I claim:—

1. A safety mechanism for automobiles including a lock for locking the hood of an automobile, a manually actuated means including a rockable rod locking and unlocking said lock, an ignition circuit, a starter circuit, a switch interposed in both of said circuits, means actuated by said rockable rod for actuating said switch in one direction, a spring for moving said switch in the opposite direction, and a combination lock for locking the rod against actuation.

2. In a safety mechanism for automobile engines, an automatically actuated switch for closing the circuit of the starter and ignition circuits of the engine, a combination lock controlled rod normally preventing said automatic operation, a lock for the hood of said engine, and manually actuated means controlled by said combination lock for causing said hood lock to function.

3. In a safety mechanism for automobile engines, a hood lock including a bracket secured to the hood of the engine and provided with an extension having a notch therein, a member on the vehicle frame having a hook shaped head adapted to fit into said notch and hold said bracket against movement, a spring acting to hold said hook shaped member in one position and manually actuated member for locking said hook shaped member on the vehicle frame so that it will fit into said notch whereby said bracket cannot be removed and said hood cannot be opened.

4. In a safety mechanism for automobile engines, an automatically actuated switch for closing the circuit of the starter and ignition circuits of the engine, a combination lock controlled rod normally preventing said automatic operation, a lock for the hood of the engine including a reciprocating bolt and means controlled by said combination lock for causing said hood lock to function, said means including a reciprocating member for actuating said bolt to function and translating means for translating the rocking action of said rod into a reciprocating action communicated to said reciprocating bolt.

5. In a safety mechanism for automobile engines, an automatically actuated switch for closing the circuit of the starter and ignition circuits of the engine, a combination lock controlled rod normally preventing said automatic operation, a lock for the hood of the engine including brackets secured to the hood of the engine, each bracket being provided with an extension having a notch therein, a member on the vehicle frame having a hook shaped head for each bracket adapted to fit into the respective notches of said brackets for holding the brackets against movement, a spring for each of said hook shaped members on the vehicle frame acting to hold the same in one position, and manually actuated means controlled by said combination lock for locking said hook shaped member on the vehicle frame so that it will fit into said notch whereby said bracket cannot be removed and said hood cannot be opened.

JOHN P. GERAGHTY.